United States Patent [19]
Wyatt

[11] 3,742,678
[45] July 3, 1973

[54] METHOD AND APPARATUS FOR CONVEYING PARAMAGNETIC, ELONGATED ARTICLES

[75] Inventor: Kenneth L. Wyatt, Oklahoma City, Okla.

[73] Assignee: Western Electric Company, Incorporated, New York, N.Y.

[22] Filed: Apr. 1, 1971

[21] Appl. No.: 130,268

[52] U.S. Cl. ................................. 53/236, 193/43
[51] Int. Cl. ...................... B65b 5/08, B65b 19/34
[58] Field of Search ...................... 53/236, 3, 26; 193/43

[56] References Cited
UNITED STATES PATENTS

| | | | |
|---|---|---|---|
| 1,249,613 | 12/1917 | Gamper | 53/236 X |
| 2,602,942 | 7/1952 | Otto | 53/236 X |
| 3,253,735 | 5/1966 | Brown et al. | 193/43 R X |
| 2,581,042 | 1/1956 | Otto | 53/236 |
| 3,570,210 | 3/1971 | Pinnolis | 53/236 X |

Primary Examiner—Granville Y. Custer, Jr.
Assistant Examiner—E. F. Desmond
Attorney—W. M. Kain, R. P. Miller and A. C. Schwarz, Jr.

[57] ABSTRACT

A paramagnetic, elongated article is introduced into an inclined nonparamagnetic magazine and is gravitationally carried down a surface thereof. One or more longitudinally aligned bar magnets, having a pole spacing which is less than the longitudinal length of the article, are positioned beneath the magazine to generate parallel lines of magnetic flux therethrough, so that the longitudinal axis of the article being gravitationally carried down the surface of the magazine is maintained parallel to the lines of magnetic flux and centered with respect to the longitudinal axes of the magnets.

2 Claims, 2 Drawing Figures

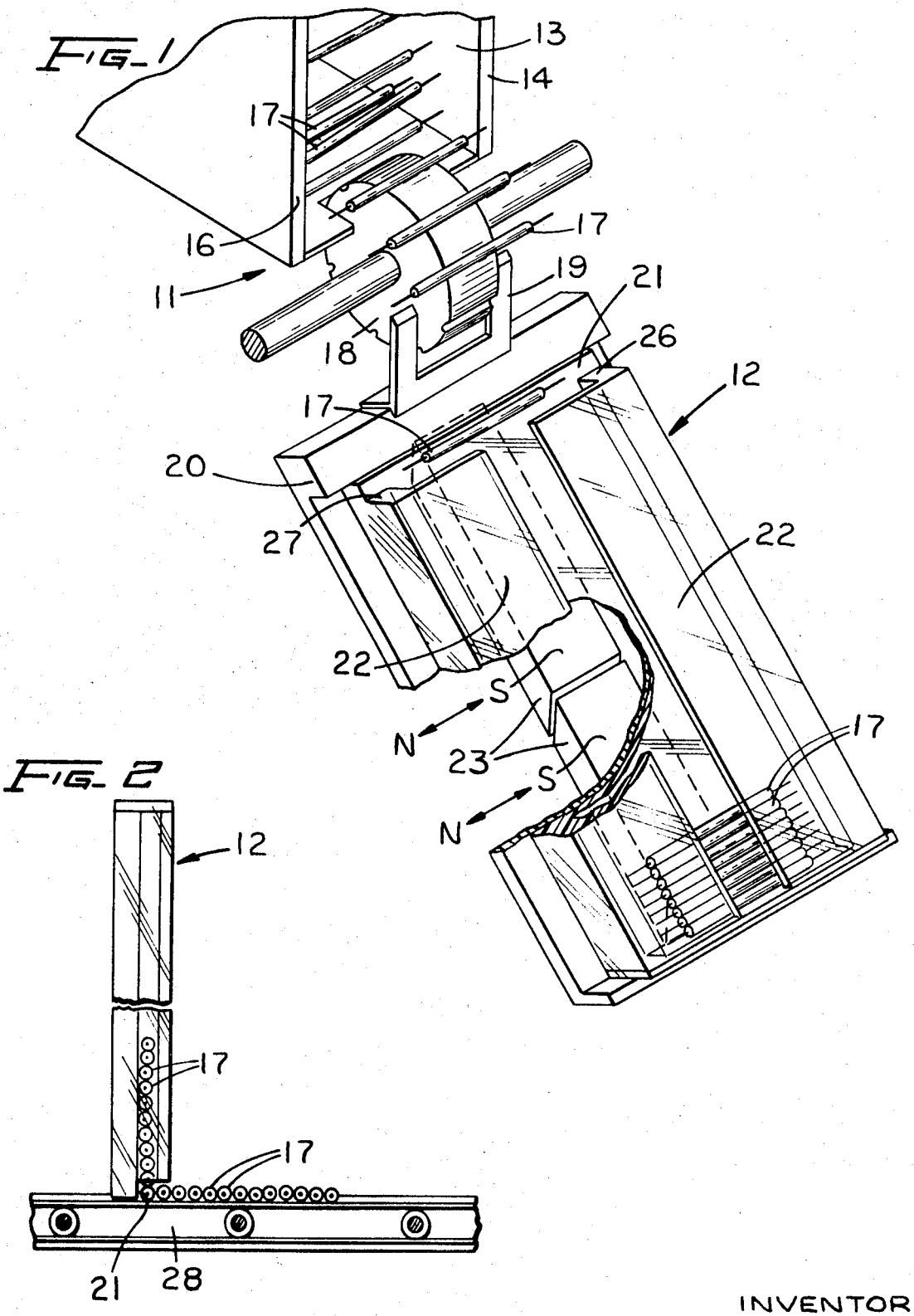

METHOD AND APPARATUS FOR CONVEYING PARAMAGNETIC, ELONGATED ARTICLES

BACKGROUND OF THE INVENTION

1. Field of the Invention

The present invention relates to paramagnetic article conveying apparatus and to methods of conveying paramagnetic articles, and in paraticular to an apparatus and method for conveying elongated, paramagnetic articles into a storage magazine while maintaining the articles in a predetermined orientation.

2. Description of the Prior Art

Certain elongated, paramagnetic articles, such as axially leaded electrical contacts must, at certain stages in a manufacturing process, be physically arranged in a uniform manner so that a particular operation, such as plating, may be performed thereon. A difficulty is in maintaining a sufficient rate of feeding the articles in an oriented manner to use the full capacity of adjunct assembly machines and/or plating apparatus. It is desirable to store a plurality of oriented articles within a storage member, or magazine, to provide a reservoir of oriented articles which may be drawn upon as assembly operations dictate.

An object of the present invention is to provide a method and apparatus for loading elongated, paramagnetic articles into a storage magazine, so that the articles are magnetically maintained in an oriented position without being attracted to either side of the magazine.

SUMMARY OF THE INVENTION

In accordance with the present invention, an apparatus for conveying an elongated, paramagnetic article comprises a nonparamagnetic support, having a downwardly inclining article receiving surface, and means for introducing the article onto the inclined surface, so that the article is gravitationally carried downward along the surface. Magnetic means beneath the support, having north and south poles extending along the incline of the support, are provided for generating lines of magnetic flux across the article receiving surface, and perpendicular to the incline of the surface, the spacing between the poles being less than the longitudinal length of the article, to maintain the longitudinal axis of the article being gravitationally carried down the surface parallel to the lines of magnetic flux and centered with respect to the points of the beginning and the ending of the lines of flux.

Preferably, the support is a magazine for receiving the article, the magazine having a downwardly extending article carrying surface. The means for generating parallel lines of magnetic flux across the article receiving, or carrying, surface is a bar magnet positioned beneath the article carrying surface, and in proximity therewith, for generating lines of magnetic flux across the article carrying surface. The longitudinal axis of the magnet extends perpendicularly to the lines of flux and the lateral depth, or spacing between the poles, of the magnet is less than the axial length of the elongated article, to maintain the article carried down the article carrying surface along the longitudinal axis of the magnet with its longitudinal axis parallel to the lines of magnetic flux and centered with respect to the longitudinal axis of the magnet.

Other objects, advantages and features of the invention will be apparent upon consideration of the following detailed description when taken in conjunction with the appended drawings.

BRIEF DESCRIPTION OF THE DRAWINGS

FIG. 1 is a partially fragmented plan view of an apparatus embodying the principles of the present invention, showing a plurality of elongated, paramagnetic articles being magnetically oriented and stored within a magazine.

FIG. 2 is a side view showing the manner in which a filled magazine is emptied onto an article receiving platform.

DETAILED DESCRIPTION

The embodiment of the invention shown in FIG. 1 of the drawings includes a feeding device 11 for singularly feeding a plurality of elongated, paramagnetic articles to a nonparamagnetic article receiving container, or magazine, 12. The feeding device 11 is comprised of an article storage bin 13 having two magnetic walls 14 and 16 for generating parallel lines of magnetic flux therebetween and within the article storage bin 13. A plurality of elongated, paramagnetic articles 17 to be stored within the magazine 12 are introduced into the article storage bin 13 and are maintained in spatial suspension with their longitudinal axis parallel to the lines of magnetic flux within the storage bin 13. A magnetic pickup wheel 18, rotated by conventional means (not shown), is introduced into the article filled storage bin 13, engages singular ones of the articles 17, and rotatably carries them to an inclined stripper plate 19. The stripper plate 19 operates to remove the articles 17 from the magnetic pickup wheel 18 so that the articles 17 are gravitationally carried down the stripper plate and introduced onto a downwardly sloping article receiving portion 21 of the magazine 12, the portion 21 being carried on a nonparamagnetic support 20. The feeding device 11 is a conventional feeding device such as that disclosed in U.S. Pat. No. 3,388,795, granted to J. E. Beroset et al. on June 18, 1968, and assigned to the assignee of the present invention.

An article 17, introduced onto the downwardly sloping article receiving portion 21 of the magazine 12, is gravitationally carried downward along the surface of the article receiving portion 21 and into an open upper end of an elongated enclosed portion 22 carried on the article receiving portion 21 of the magazine 12. The enclosed portion 22 terminates at its lower end, so that each article carried into the enclosed portion 22 of the magazine 12 is stacked on top of the preceding article which was introduced into the enclosed portion 22.

One or more longitudinally aligned bar magnets 23 (two bar magnets being shown) are centered beneath the non-paramagnetic support 20 and therefore beneath the article receiving portion 21, and in proximity therewith, to generate across the article receiving surface of the portion 21 and within the enclosed article receiving portion 22 uniform, parallel lines of magnetic flux. The parallel lines of magnetic flux operate to maintain the elongated, paramagnetic articles 17 in an oriented position, with their longitudinal axis parallel to the lines of magnetic flux, as the articles 17 are gravitationally carried downward along the article receiving portion 21 and into the enclosed portion 22 of the magazine 12. When more than one bar magnet is employed, the pole facings of each magnet are positioned such that there is continuity in both the north and the south pole facings (as shown in the fragmented area of FIG. 1). The maximum lateral movement of the elongated article 17 as it is gravitationally conveyed through the enclosed portion 22 of the magazine 12 is determined by two sides 26 and 27 of the enclosed portion 22, the space between the sides 26 and 27 being sufficient to allow unobstructed passage of the article 17 as it longitudinally passes therebetween.

Preferably, the lateral spacing between the beginning and the ending of the lines of flux, or between the north and the south poles of the magnets 23 is less than the longitudinal length of the article 17, the article 17 being magnetically maintained within the magnetic field generated between the north and the south poles of the magnets 23 with its longitudinal axis parallel to the lines of magnetic flux. With the magnets 23 longitudinally centered between the sides 26 and 27, the article 17, maintained within the magnetic field generated by the magnets 23, is prevented from engaging the sides 26 or 27 with either of its two ends. Also, with the spacing between the north and the south poles of the magnets 23 less than the longitudinal length of the article 17, the article 17 is magnetically maintained centered over the longitudinally axis of the magnets 23 as it is gravitationally carried downward through the enclosed portion 22 of the magazine 12. The smaller the spacing between the pole facings of the magnets 23 with respect to the longitudinal length of the article 17, the smaller is the possible lateral displacement of the article 17 as it is carried through the enclosed portion.

The angle at which the magazine 12, and therefore the downwardly sloping article receiving portion 21, is positioned, is dependent upon five conditions: (1) the weight of the elongated, paramagnetic article 17, (2) the ratio of ferrous to non-ferrous material contained in the paramagnetic article 17, (3) the distance maintained between the paramagnetic article 17 and the magnets 23 which are located beneath the downwardly sloping article receiving portion 21 of the magazine 12, (4) the magnetic strength of the magnets 23, and (5) the orientation of the magnets 23. The angle of the article receiving portion 21 is adjusted to provide an article drop rate which ensures that the articles 17, being carried into the magazine 12, are not broken as they engage the previously carried article. The orientation of the magnets 23 must be such as to ensure proper orientation of the paramagnetic articles 17; that is, the lines of force generated between the north and the south poles of the bar magnets 23 must be parallel to the longitudinal axes of the elongated, paramagnetic articles 17 when the articles 17 are in the desired oriented position.

FIG. 2 shows the manner in which a magazine 12, previously filled with a plurality of articles 17, is emptied onto an article receiving platform 28 such that the plurality of articles 17 are deposited uniformly and in an oriented position upon the platform 28. The magazine 12 is removed from the support 20 and is inverted upon the platform 28 with the open end of the enclosed portion 22 extending downwardly, while being simultaneously drawn along the surface of the platform 28 to provide a discharge of articles 17 onto the platform 28. The articles 17, deposited upon the platform 28 are carried by the platform 28 to a subsequent manufacturing operation.

While one particular embodiment of the invention has been described in detail, it is understood that various other modifications and embodiments may be devised by one skilled in the art without departing from the spirit and scope of the invention.

I claim:

1. In an apparatus for stacking elongated articles having axially extending paramagnetic leads within a container, wherein the articles are initially stored in spatial relationship to each other:

a nonparamagnetic support mounted on a downward incline with respect to the stored articles;

a nonparamagnetic magazine positioned on the support, said magazine having a base wall abutting the support, two side walls spaced apart a distance slightly greater than the longitudinal length of an article, and a top wall extending from one of the side walls at a distance from the base wall to define an article receiving opening that has a width that is slightly greater than the maximum transverse cross-sectional dimension of an article so that articles may be stacked one on top of another within the opening;

means for feeding a continuous succession of stored articles into the top portion of the opening within the magazine, and a bar magnet centered with respect to the magazine and positioned beneath said support, with its opposite poles positioned transversely of the inclined support and spaced a distance less than the longitudinal length of an article, for generating lines of magnetic force which extend transversely across the opening within said container to maintain the article in parallel relation as the articles are moved into stacked relation within the container.

2. In an apparatus for stacking elongated articles having axially extending paramagnetic leads, wherein the articles are initially stored in spatial relationship, the improvement comprising:

a support inclined to the stored articles;

a nonparamagnetic magazine, positioned on the inclined support, having a base wall and side walls secured to the base wall, the side walls having an inside wall spacing slightly greater than the axial length of the articles and the extending leads, and extending perpendicularly from the base wall and terminating at a distance from the base wall slightly greater than the thickness of an article, and a top wall structure extending from the side walls to form an article receiving opening in the magazine;

a plate secured to the bottom of the magazine for retaining the articles in the magazine in stacked, one on top of another, relationship;

magnetic means having north and south poles extending transversely of the magazine and along the length of the magazine for maintaining articles dropping through the magazine in parallel relationship transverse to the base wall, said magnetic poles being spaced apart a distance less than the overall axial length of an article and its extending leads, and means for advancing seriatim stored articles into the magazine.

* * * * *